United States Patent
Horiguchi

(10) Patent No.: US 7,200,248 B2
(45) Date of Patent: *Apr. 3, 2007

(54) EYE IMAGE PICKUP APPARATUS AND ENTRY/LEAVE MANAGEMENT SYSTEM

(75) Inventor: Shuichi Horiguchi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 681 days.

This patent is subject to a terminal disclaimer.

(21) Appl. No.: 10/283,817

(22) Filed: Oct. 30, 2002

(65) Prior Publication Data

US 2003/0085996 A1    May 8, 2003

(30) Foreign Application Priority Data

Oct. 31, 2001    (JP)    ............ P. 2001-334647

(51) Int. Cl.
 G06K 9/00   (2006.01)
 H04N 7/18   (2006.01)
 H04N 9/47   (2006.01)
 A61B 3/14   (2006.01)

(52) U.S. Cl. ............... 382/117; 348/78; 351/206

(58) Field of Classification Search ............. 382/117; 348/78; 351/206
See application file for complete search history.

(56) References Cited

U.S. PATENT DOCUMENTS

| | | | | |
|---|---|---|---|---|
| 4,372,655 A | * | 2/1983 | Matsumura et al. | 351/206 |
| 4,464,608 A | * | 8/1984 | Pilley | 315/241 P |
| 4,641,349 A | * | 2/1987 | Flom et al. | 382/117 |
| 5,000,181 A | * | 3/1991 | Katsuragi | 600/401 |
| 5,742,374 A | * | 4/1998 | Nanjo et al. | 351/206 |
| 5,784,148 A | * | 7/1998 | Heacock | 351/221 |
| 5,988,815 A | * | 11/1999 | Maus et al. | 351/221 |
| 6,244,710 B1 | * | 6/2001 | Ogawa | 351/206 |
| 6,490,365 B2 | * | 12/2002 | Horiguchi et al. | 382/117 |
| 6,520,640 B1 | * | 2/2003 | Binnun | 351/206 |
| 6,549,118 B1 | * | 4/2003 | Seal et al. | 340/5.82 |
| 6,594,377 B1 | * | 7/2003 | Kim et al. | 382/117 |
| 6,669,339 B2 | * | 12/2003 | Nanjyo | 351/206 |
| 6,687,389 B2 | * | 2/2004 | McCartney et al. | 382/118 |
| 6,785,406 B1 | * | 8/2004 | Kamada | 382/117 |
| 2002/0005893 A1 | | 1/2002 | Horiguchi et al. | |
| 2002/0106113 A1 | * | 8/2002 | Park | 382/117 |

FOREIGN PATENT DOCUMENTS

| | | |
|---|---|---|
| JP | 10-137225 | 5/1998 |
| JP | 10-505180 | 5/1998 |
| WO | WO 96/07978 | 3/1996 |

* cited by examiner

Primary Examiner—Bhavesh M Mehta
Assistant Examiner—Damon Conover
(74) Attorney, Agent, or Firm—Pearne & Gordon LLP

(57) ABSTRACT

An eye image pickup apparatus includes an image pickup unit, a guide mirror, a range sensor, and an infrared illuminating section. The image pickup unit includes an objective lens, an image pickup element such as a CCD, a shooting section and a light guide section as a basic configuration, and the image pickup unit shoots an image of an eye of a person. The guide mirror guides a subject to a shooting position. The range sensor measures the distance between the image pickup apparatus and the subject. The infrared illuminating section illuminates the subject. Rough guidance of the user is made using the guide mirror and fine alignment is made by using a guiding visible light obtained from the light guide section.

15 Claims, 9 Drawing Sheets

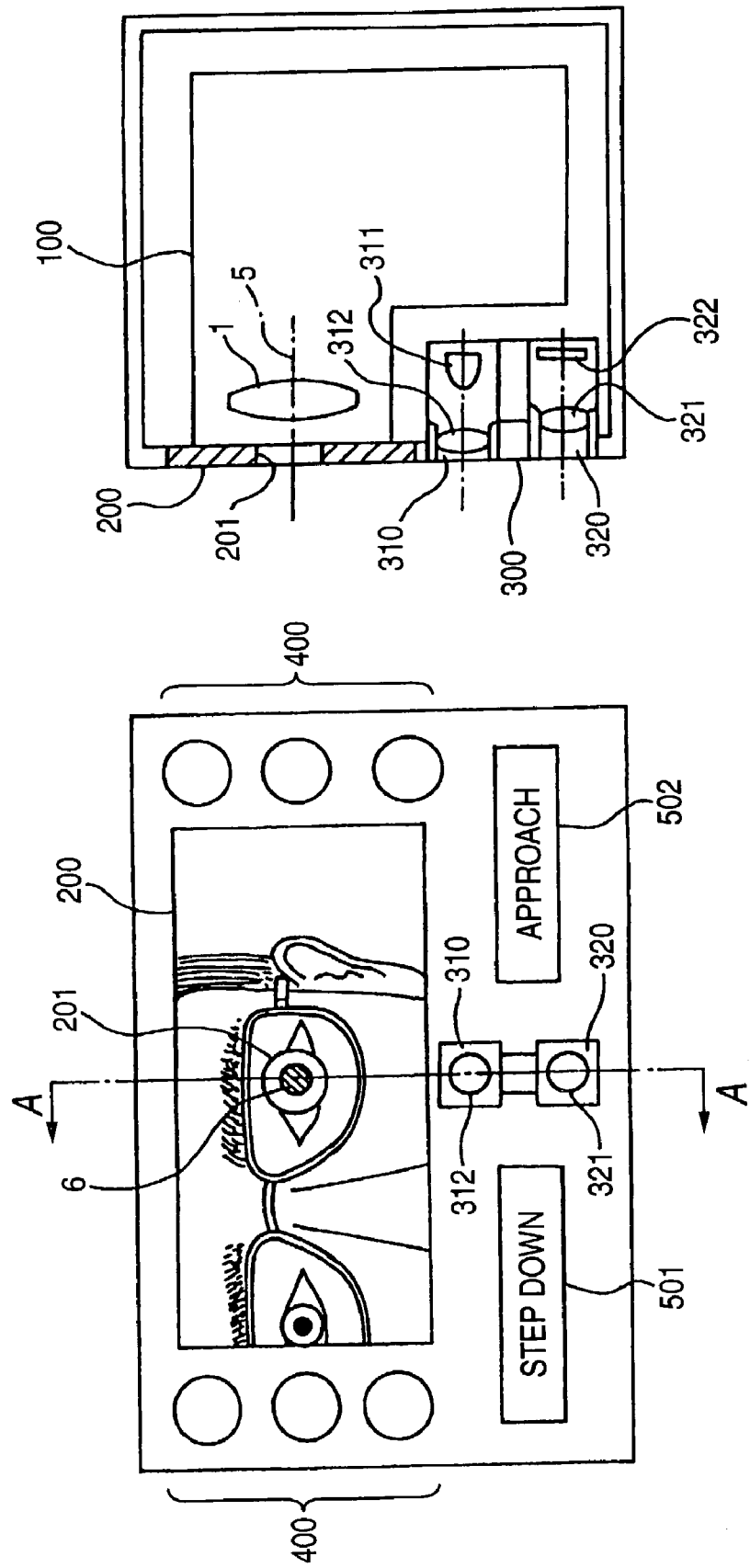

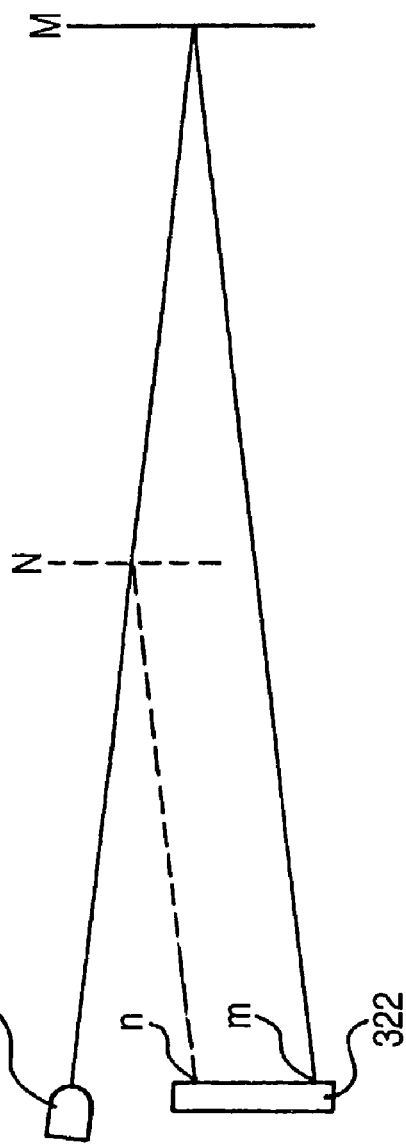
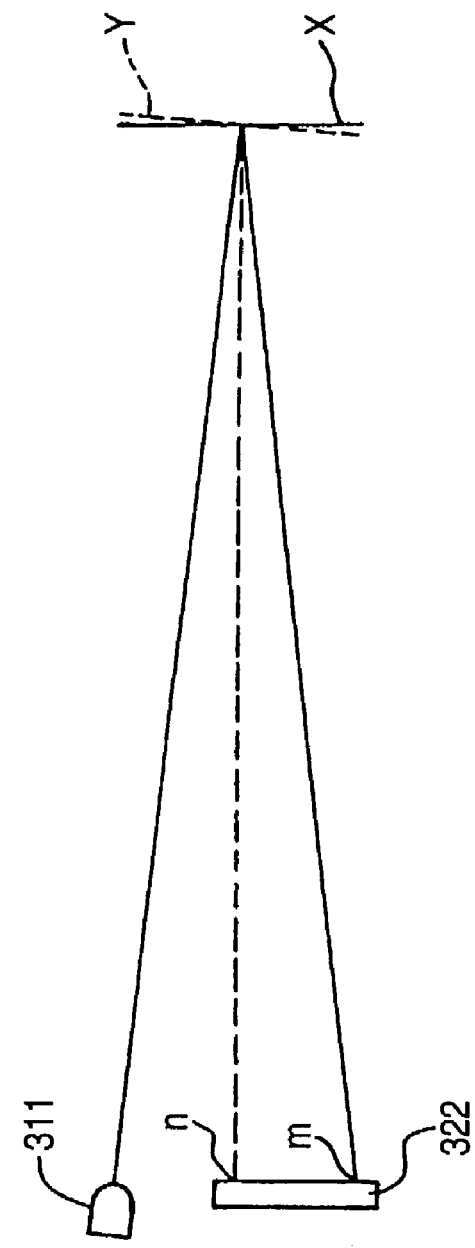
FIG. 2A
FIG. 2B

EYE IMAGE PICKUP APPARATUS AND ENTRY/LEAVE MANAGEMENT SYSTEM

BACKGROUND OF THE INVENTION

The present invention relates to an eye image pickup apparatus for acquiring an image of a human eye and an entry/leave management system utilizing the eye image pickup apparatus.

An iris image is used for personal authentication for entry/leave management and a user of an ATM (Automatic Teller Machine), a computer and a cellular phone. A human iris pattern is formed in his/her childhood and differs from person to person and from the left eye to right eye of a person. Thus the iris pattern data is excellent for personal identification.

As eye image pickup apparatus for acquiring an iris pattern is known to identify the position of an eye by using a camera with a wide field of view and to picking up an image of the eye while moving the field of view of a telephotographic camera, for example, Japanese Patent Publication No. H10-137225. Such apparatus, however, requires a large-scale configuration and has limited applications. In particular, application to portable apparatus such as a cellular phone is virtually impossible.

A conventional eye image pickup apparatus includes an objective lens 1 and an image pickup element 2 such as a CCD with a half mirror or cold mirror 21 arranged in front of the objective lens 1, as shown in FIG. 3. The cold mirror is a mirror which reflects a visible light and transmits an infrared light and can be used for shooting with illumination of an infrared light. Apparatus in FIG. 3 can correctly shoot an image of an eye of a user of the apparatus when the eye of the user is on an optical axis 5 of a shooting optical system thus the eye image is reflected at a specific location of the mirror. The apparatus requires a mirror 21 larger than the lens 1. This makes it difficult to apply the apparatus to portable apparatus. Also, when an eye of a user of the apparatus is not reflected in the mirror 21 as shown in the figure, the user does not know in which way he/she should move. In case the dominant eye of the user is different from the eye reflected in the mirror 21, the user cannot make correct positioning.

An apparatus has been devised where first edge means and second edge means are provided in the field of view of a telephotographic camera of eye image pickup apparatus for acquiring an iris pattern for the user to position his/her eye, for example, Japanese Patent Publication No. H10-505180. Both the first and second edge means are arranged in front of the lens of the telephotographic camera thus requires a large-scale apparatus arrangement thus making difficult the application to portable apparatus such as a cellular phone.

Then, an eye image pickup apparatus is proposed in U.S. Patent Application Publication No. 2002/0005893 A1, the eye image pickup apparatus solves the aforementioned problems in a conventional apparatus and can correctly shoot an eye image in a short time with a simple configuration which can be mounted on portable apparatus.

FIG. 4 shows a basic configuration of the proposed eye image pickup apparatus which includes an objective lens 1, an image pickup element 2 such as a CCD constituting an image pickup section, a shading unit 3 as a mark and a light guide section 4. The shading unit 3 shades part of a shooting optical path and provided concentrically with an optical axis 5 of a shooting optical system. The shading unit 3 is preferably provided on a lens and is preferably in the shape of a circle. The light guide section 4 guides a visible light from a visible light source (not shown) toward the objective lens 1 at a midpoint in the shooting optical path. Guide position of the visible light is closer to the image pickup element than the shading unit 3. The cross section of a visible light thus guided has a similar shape to the shading unit 3 and its center coincides with the optical axis 5. Area ratio of the cross section of the visible light to the effective optical path cross section of the shooting optical system is approximately equal to or slightly larger than that of the shading unit 3 to the effective optical path cross section of the shooting optical system.

In the apparatus in FIG. 4, when the eye is on the optical axis 5, the shading unit 3 and the guiding visible light 6 have an approximately equal area so that they look like an annular eclipse as shown in FIG. 5A. The image shot by the image pickup element 2 has an eye in the center as shown in FIG. 5B. It is possible to accurately recognize an iris pattern by capturing a shot image in this state.

On the other hand, when the position of the eye is not on the optical axis 5, the image of the shading unit and the guiding visible light look like a partial eclipse in FIG. 5C. The image shot by the image pickup element 2 looks like FIG. 5D. A favorable iris pattern is not obtained in this state so that it is necessary to move the position of the eye. The direction the eye should move in is easily recognized by FIG. 5C.

As shown in FIG. 6, the light guide section 4 is arranged at a position closer to the image pickup element 2 than the middle point a of the objective lens 1 and the image pickup element 2. In case the light guide section 4 is arranged closer to the objective lens 1 (for example position b), when the center of an eye to be shot (right eye R in the figure), the shading unit and the light guide section 4 are on the same straight line, the light guide section 4 is seen from the other eye (left eye L in the figure), which makes it more difficult to position the eye. On the other hand, when the light guide section 4 is brought closer to the image pickup element 2, the light guide section is not seen from the left eye L so that it is easier to position the eye. In particular, a person who cannot close one eye (wink) can easily position his/her eye.

The shading unit 3 in FIGS. 4 and 5 is provided on an optical axis of a shooting optical system but may be provided in an annular way on the periphery of the lens 1. That is, the periphery of the lens 1 may be shaded in an annular way. FIG. 7 is an example of an annular shading unit by way of a lens catch 13 provided on the lens. In the apparatus in FIG. 7, when an eye of a user is on the optical axis, the opening of the lens catch 13 and the guiding visible light 6 looks concentric. An image shot by the image pickup element 2 has an eye in the center as shown in FIG. 8B. When the eye is not on the optical axis, the visible light 6 looks partially and the image shot by the image pickup element 2 is as shown in FIG. 8D. In FIGS. 8A and 8C, a numeral 18 represents the opening of the lens catch 13. Providing an annular shading unit in this way allows a shading unit to be manufactured by changing the dimensions of the lens catch 13 and thus can be manufactured at lower cost than a shading unit on an optical axis.

FIG. 9 shows a general configuration of an example of the proposed eye image pickup apparatus. An objective lens 1 is attached on a one end of a lens-barrel 8 by way of a lens catch 13. On the other end of the lens-barrel, an image pickup section 7 having a CCD 2 as an image pickup element is provided. The specific structure of the image pickup section 7 may be changed as required depending on the structure of a device to be employed so that the details will be skipped. In the center of an inner surface of the lens-barrel 8 of the objective lens 1, a shading unit 3 in a circular shape with its center aligned with the optical axis 5 is provided. The shading unit 3 can be formed by gluing a black sticker onto the objective lens 1. Alternatively, the shading unit 3 can be formed by applying a black paint onto the objective lens 1.

By providing a white or yellow sticker or a white or yellow paint as a shading unit 3, the position of the shading unit 3 is made easier to locate. This is because the shading unit 3 in a fair color is easier to find although the shading unit 3 in a dark color makes it difficult to locate the shading unit 3.

An optical fiber 9 inserted from the side face of the lens-barrel 8 is provided inside the lens-barrel 8. On the optical fiber 9 at the end outside the lens-barrel 8, an LED 10 constituting a visible light source is provided to face the end face of the optical fiber 9. A visible light emitted from the LED 10 may be of any color but preferably green considering the human identification ability. The other end of the optical fiber 9 is bent toward the objective lens 1 so that the end face 11 will be perpendicular to the optical axis 5 and its center coincides with the optical axis 5. Thus, the visible light from the LED 10 serves as a guiding visible light 6 toward the objective lens 1 via the end face 11. The side face of the optical fiber 9 is painted black in order to decrease the influence on the image pickup element 2.

Area ratio of the end face 11 of the optical fiber 11 to the effective optical path cross section of the shooting optical system is set approximately equal to or slightly larger than that of the shading unit 3 to the effective optical path cross section of the shooting optical system. When setting is made this way, the shading unit 3 and the guiding visible light 6 look like an annular eclipse shown in FIG. 5A as seen on the optical axis external to the lens-barrel 8. The larger the area ratio of the end face 11 of the shading unit 3 to the effective optical path cross section of the shooting optical system, the better its visibility becomes but the brightness of the shot image decreases. An area ratio of about 5% is preferable.

An infrared light is appropriate for shooting an iris. Thus an infrared light generator (not shown) is preferably provided on the periphery of the objective lens 1 of the lens-barrel 8 to shoot an infrared image. In this case, providing a visible light cutoff filter 12 before the image pickup section 7 in order to eliminate the influence of the visible light on the CCD 2 can acquire a more accurate image.

In case the shading unit is annular, the dimensions of the lens catch 13 are changed and a sticker or a paint is not applied.

FIG. 10 shows a general configuration of an example of the proposed eye image pickup apparatus. The same numerals are used to show the same components in FIG. 9 and corresponding description is omitted. The configuration in FIG. 10 differs from the shooting optical system in FIG. 9 in that the lens-barrel 17 is bent approximately at a right angle and an optical path bending mirror 14 for bending the shooting optical path is provided at the bent section of the lens-barrel 17. The surface of the optical path bending mirror 14 facing the objective lens 1 is provided with a reflective film 15 by way of aluminum evaporation except for the periphery of the optical axis 5.

On the side face of the lens-barrel of the optical path bending mirror 14 opposite to the objective lens 1, an LED 10 is provided on the extension line of the optical axis 5. A visible light is introduced as a guiding visible light 6 toward a transmitting section 16 of the optical path bending mirror 14. The transmitting section 16 is formed so that the cross section perpendicular to the optical axis 5 will be in the shape of a circle and functions as a light guide section for a visible light. An optical fiber may be provided in between in order to efficiently introduce a visible light from the LED 10.

Area ratio of the cross section of the transmitting section 16 perpendicular to the optical axis 5 to the effective optical path cross section of the shooting optical system is set approximately equal to or slightly larger than that of the shading unit 3 to the effective optical path cross section of the shooting optical system. When setting is made this way, the shading unit 3 and the guiding visible light 6 look like an annular eclipse shown in FIG. 5A as seen on the optical axis external to the lens-barrel 8. An area ratio of about 5% is preferable as the area ratio of the shading unit 3 to the effective optical path cross section of the shooting optical system.

When the transmitting section 16, shading unit 3 and the center of an eye are on the same line, it is possible to shoot the eye in the center of a shot image. However, to know whether the image is focused, it is necessary to check on the monitor screen. Focusing without checking the image on the monitor screen is possible in case the color of the transmitting section changes between when focus is achieved and when it is not. Thus, providing a dual-color LED at the rear of the transmitting section 16 and changing the color of the LED between when focus is achieved and when it is not allows focusing without checking the image on the monitor screen.

FIG. 11 shows a general configuration of another example of the proposed eye image pickup apparatus. The same numerals are used to show the same components in FIGS. 9 and 10 and corresponding description is omitted. The apparatus in FIG. 11, same as that in FIG. 10, is characterized in that the lens-barrel 17 is bent approximately at a right angle and an optical path bending mirror 14 for bending the shooting optical path is provided at the bent section of the lens-barrel 17. The apparatus in FIG. 11 differs from that in FIG. 10 in that the dimensions of the lens catch 13 are made smaller than those of the apparatus in FIG. 10 and a sticker or a paint is not applied.

As mentioned earlier, according to the proposed eye image pickup apparatus, it is possible to grasp the eye moving direction by way of the alignment of the mark with the guiding visible light seen when the user looks through the objective lens. It is thus possible to accurately acquire an iris image even when the image pickup apparatus is downsized so as to be incorporated into portable apparatus. The mark and the light guide section are provided on or behind the lens so that an additional element for positioning an eye keeps the apparatus configuration compact. This configuration is easy to use when the user has accustomed to it, like the case where a same person uses a PC every day regularly when he/she logs in to the system.

Like a case where a great number of people use the apparatus, not necessarily frequently, while they are standing, such as when the invention is applied to an entry/leave management system, the following problems occur. First, although it is easy to guide an eye of a user to the center of the opening 18 as long as the guiding visible light is in the opening 18 of the lens catch 13 as shown in FIG. 8A, it is difficult to determine in which direction the user should move his/her eye in case the eye is at a different height. Another problems is how to focus the eye image in shooting. It is possible to guide the user by changing the color of the transmitting section 16 between when focus is achieved and when it is not, as in the apparatus shown in FIGS. 10 and 11.

However, a great number of people who use the apparatus not necessarily frequently, such as users of an entry/leave management system, cannot easily determine whether to approach or step back. That is, there is no means for making rough guidance so that it is not easy for an unaccustomed person to correctly position his/her eye to be shot on the shooting path.

SUMMARY OF THE INVENTION

The invention has been proposed in view of the aforementioned circumstances and aims at providing eye image pickup apparatus of a simple configuration whereby an unaccustomed person can appropriately shoot an eye image and an entry/leave management system utilizing the eye image pickup apparatus.

An eye image pickup apparatus according to the invention is apparatus for shooting an image of an eye of a person by using at least an objective lens and an image pickup section, the apparatus comprising a mark provided concentrically with the optical axis of a shooting optical system for shooting the image of an eye, a light guide section for guiding a visible light from a visible light source toward the objective lens at a midpoint in a shooting optical path, and a guide mirror having a visible light transmitting section concentrically with the axis arranged in front of the objective lens, characterized in that the light guide section is positioned closer to the image pickup section than the mark, that the center of the light guide section coincides with the optical axis and that the light guide section and the mark are seen by the person. With this configuration, it is possible to make rough guidance by using a guide mirror and grasp the eye moving direction by way of the alignment of the mark with the guiding visible light seen when the user looks through the objective lens. It is thus possible for an unaccustomed user to position an eye to be shot accurately in a short time on the shooting optical path.

An eye image pickup apparatus according to the invention comprises a light projecting/receiving range sensor arranged below the objective lens, characterized in that the output of the light projecting/receiving range sensor is used for guiding the user to the shooting position in the direction of the optical axis. With this configuration, it is made easy to perform focusing in shooting.

An eye image pickup apparatus according to the invention is characterized in that the light projector and the light receiver of the light projecting/receiving range sensor are arranged in the perpendicular direction. With this configuration, it is possible to accurately measure the distance to a subject thus upgrading the accuracy of focusing in shooting.

An eye image pickup apparatus according to the invention is characterized in that the light guide section is arranged at a position closer to the image pickup section than the middle point of the objective lens and the image pickup section. With this configuration, the light guide section is not seen from the other eye not under shooting thus facilitating the positioning of an eye.

An eye image pickup apparatus according to the invention is characterized in that the mark comprises a shading unit for shading part of the shooting optical path. This facilitates recognition of the mark.

An eye image pickup apparatus according to the invention is characterized in that the shading unit is provided in an annular way on the periphery of the objective lens.

An eye image pickup apparatus according to the invention is characterized in that the shading unit is formed by a lens catch of the objective lens or the visible light transmitting section of the guide mirror. With this configuration, the shading unit can be manufactured at low cost.

An eye image pickup apparatus according to the invention is characterized in that the shooting optical system includes an optical path bending mirror between the objective lens and the image pickup section and that the light guide section includes a visible light transmitting section formed around the optical axis of the optical path bending mirror. With this configuration, it is possible to configure compact image pickup apparatus.

An eye image pickup apparatus according to the invention is characterized in that the visible light guided by the light guide section is obtained from a dual-color LED arranged behind the visible light transmitting section and changes its color between when focus is achieved and when it is not. The visible light further changes its color depending on the direction of dislocation assumed in case focus is not achieved. With this configuration, it is made easy to determine whether focus is achieved and move for positioning of an eye.

An eye image pickup apparatus according to the invention further comprises illuminating means via an infrared light and a visible light cutoff filter, characterized in that the illuminating means illuminates a subject and that the visible light cutoff filter is arranged between the guide position of the visible light and the image pickup section and shades a visible light introduced into the image pickup section. With this configuration, it is possible to shoot an eye image by way of an infrared light and eliminate the effect of a visible light on an image pickup apparatus thus acquiring a highly accurate image.

An entry/leave management system according to the invention uses the aforementioned eye image pickup apparatus.

BRIEF DESCRIPTION OF THE DRAWINGS

FIGS. 1A and 1B show a general configuration of eye image pickup apparatus according to an embodiment of the invention;

FIGS. 2A and 2B explain the operation of a range sensor;

DETAILED DESCRIPTION OF THE PREFERRED EMBODIMENT

Figure 3:
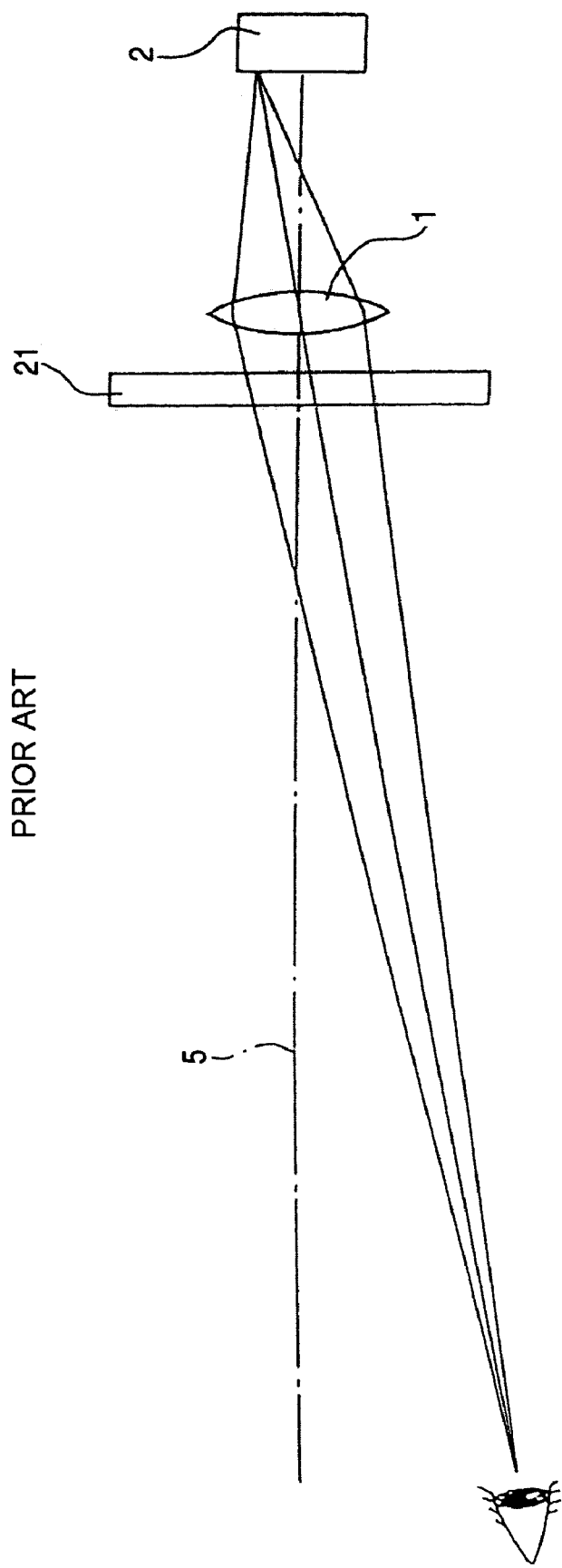
FIG. 3 shows a basic configuration of a conventional eye image pickup apparatus.
Figure 4:
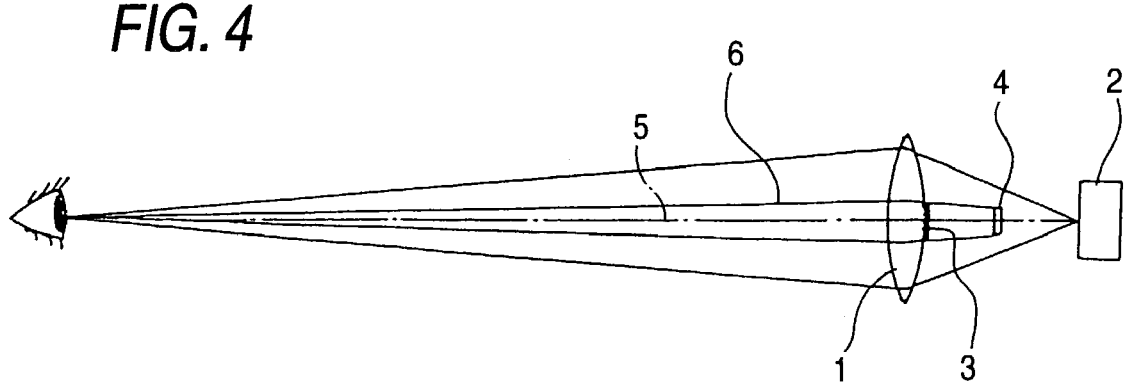
FIG. 4 shows a basic configuration of the proposed eye image pickup apparatus.

An embodiment of the invention will be described referring to drawings. FIG. 1 shows a general configuration of an eye image pickup apparatus in the embodiment of the invention. FIG. 1A is a front view and FIG. 1B is a sectional view along the line A—A. The eye image pickup apparatus in FIG. 1 includes an image pickup unit 100, a guide mirror 200, a range sensor 300, and an infrared illuminating section 400. The image pickup 100 unit uses an objective lens and an image pickup section to shoot an image of an eye of a person. The guide mirror 200 guides a subject to a shooting position. The range sensor 300 measures the distance between the image pickup apparatus and the subject. The infrared illuminating section 400 illuminates the subject.

Figure 11:
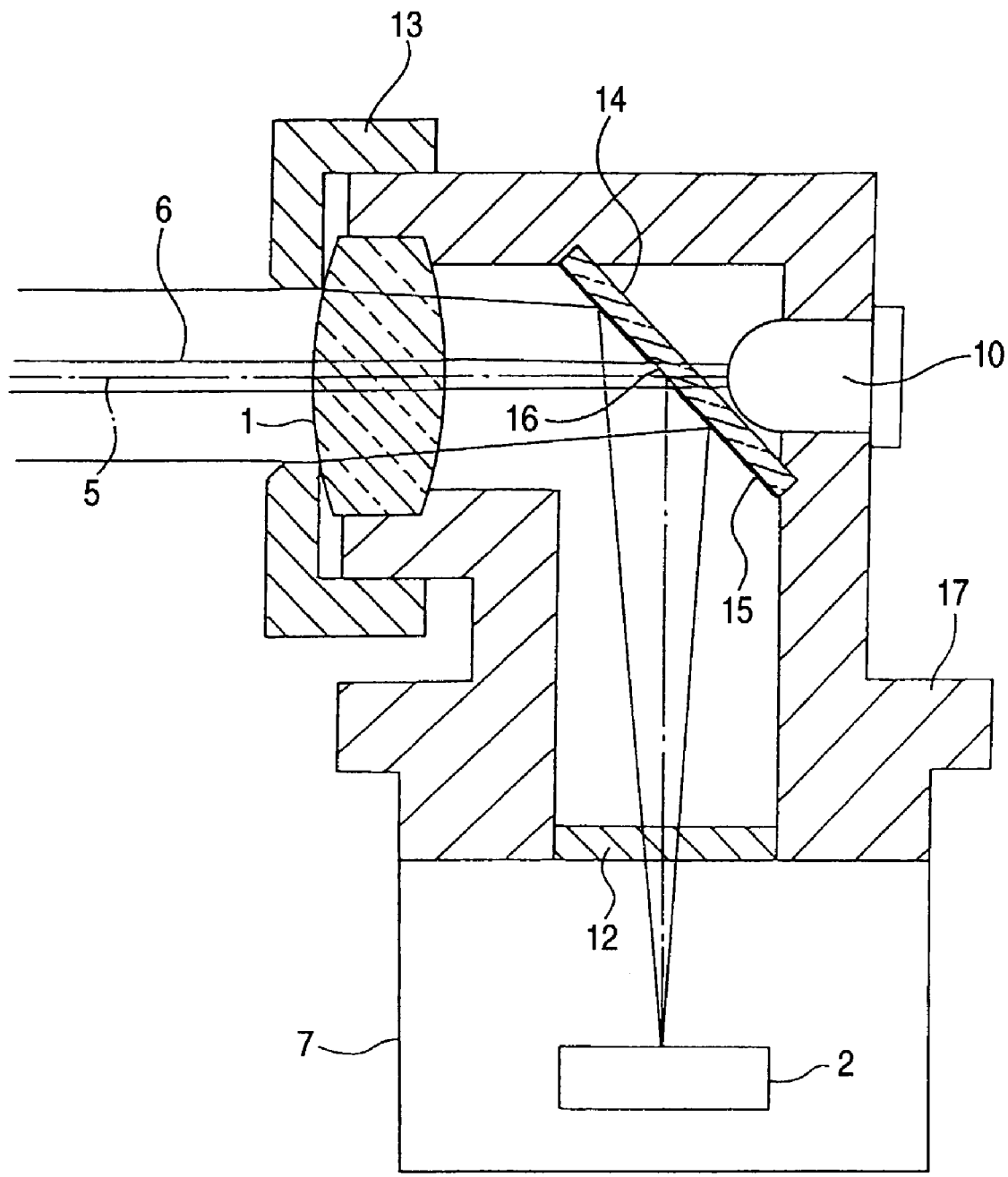
FIG. 11 shows a general configuration of another specific example of the proposed eye image pickup apparatus.

The image pickup unit 100 uses the eye image pickup apparatus in the existing proposal (U.S. Patent Application Publication No. 2002/0005893 A1) explained in the related art or partially modifies the eye image pickup apparatus for use. In the example of FIG. 1B, an image pickup unit having an annular shading unit as a mark shown in FIG. 11 is used. In FIG. 1, only an objective lens 1 is shown to indicate the alignment with other elements and other elements are not shown. While the apparatus in FIG. 11 constitutes an annular shading unit by way of a lens catch 13, the image pickup unit 100 in FIG. 1 uses a guide mirror 200 as a shading unit.

The guide mirror 200 is arranged in front of the objective lens 1 of the image pickup unit 100 and used for rough guidance of a user wishing to shoot an eye image. The guide mirror 200 forms a visible light transmitting section 201 concentrically with an optical axis of a shooting optical path of the image pickup unit 100. Thus, the visible light transmitting section 201 looks darker from its surrounding. When the user places his/her eye in close proximity of the optical axis 5, he/she can see a guiding visible light in the visible light transmitting section 201. FIG. 1A shows a state where an eye is correctly on the optical axis.

The range sensor 300 is arranged below the objective lens 1 and measures the distance between the objective lens 1 and the subject. The range sensor 300 is a light projecting/receiving range sensor and has a light projector including a light source 311 and a lens 312 and a light receiver including a lens 321 and a photo-detector 322. A measuring light from the light source 311 is output in a direction slightly tilted downward from the vertical direction and a reflected light which reflected on a target to be measured (subject) impinges on a photo-detector 322. Thus, as shown in FIG. 2(a), the photo-detector 322 receives the reflected light at a different position depending on the position of the subject. For example, when a target to be measured exists at a position M, the photo-detector 322 receives the reflected light at a position m. When a target to be measured exists at a position N, the photo-detector 322 receives the reflected light at a position n. Thus it is possible to measure the distance to the target to be measured depending on the photo-detecting position of the photo-detector.

The detecting principle of the range sensor 300 assumes that the reflecting surface of the target to be measured is even. In case the reflecting surface of the target to be measured is uneven, the detecting accuracy is decreased. This will be explained referring to FIG. 2B. Taking as a reference the case where the reflecting surface of the target to be measured is approximately perpendicular (X in the figure), the photo-detector 322 detects a reflected light at a position m in the reference state X although the photo-detector 322 detects a reflected light at a position n in the reference state Y in the figure where the reflecting surface of the target to be measured is tilted. This leads to a determination that the target to be measured exists at the position N.

Thus, in case a light projecting/receiving range sensor is used as a range sensor 300, it is necessary to avoid variation in the tilt of the reflecting surface of the target to be measured. The invention, taking advantage of that fact that there is a small variation in the vertical direction around the cheek just below an eye, arranges the range sensor 300 below the objective lens 1 and arranges the light projector 310 and the light receiver 320 in the perpendicular direction to upgrade the detecting accuracy.

Output of the range sensor 300 is used for guidance of the shooting position in the direction of an optical axis, that is, focusing in shooting. Since the distance between the objective lens 1 and the image pickup element 2 of the image pickup unit 100 is fixed, guidance is made so that the distance between the objective lens 1 and the subject will be a predetermined value in order to bring the eye image in focus. Guide message indicators 501, 502 in FIG. 1A indicate the direction in which the user (subject) should move, depending on the detected value of the range sensor 300. In case it is necessary to step back from the image pickup apparatus for focusing, the guide message indicator 501 is illuminated. In case it is necessary to approach the image pickup apparatus for focusing, the guide message indicator 502 is illuminated.

In case the guiding visible light 6 of the image pickup unit is illuminated using a dual-color LED, color is change between when focus is achieved and when it is not. In case the image is out of focus, color is changed depending on the direction of dislocation to instruct the moving direction. In this case, control of three states, either LED of the dual LED is illuminated and both are illuminated, to provide three colors. In case the dual-color LED illuminates in red and green, color variations are red, green and orange.

Figure 5A:
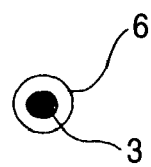
FIGS. 5A to 5D show examples of how the shading unit and the guiding visible light in the apparatus in FIG. 4 look like and the resulting images shot by the image pickup element.
Figure 5B:
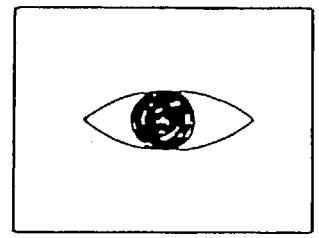
Figure 5C:
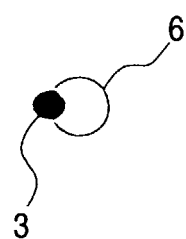
Figure 5D:
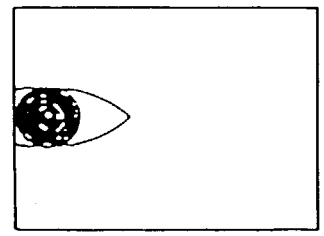
Figure 6:
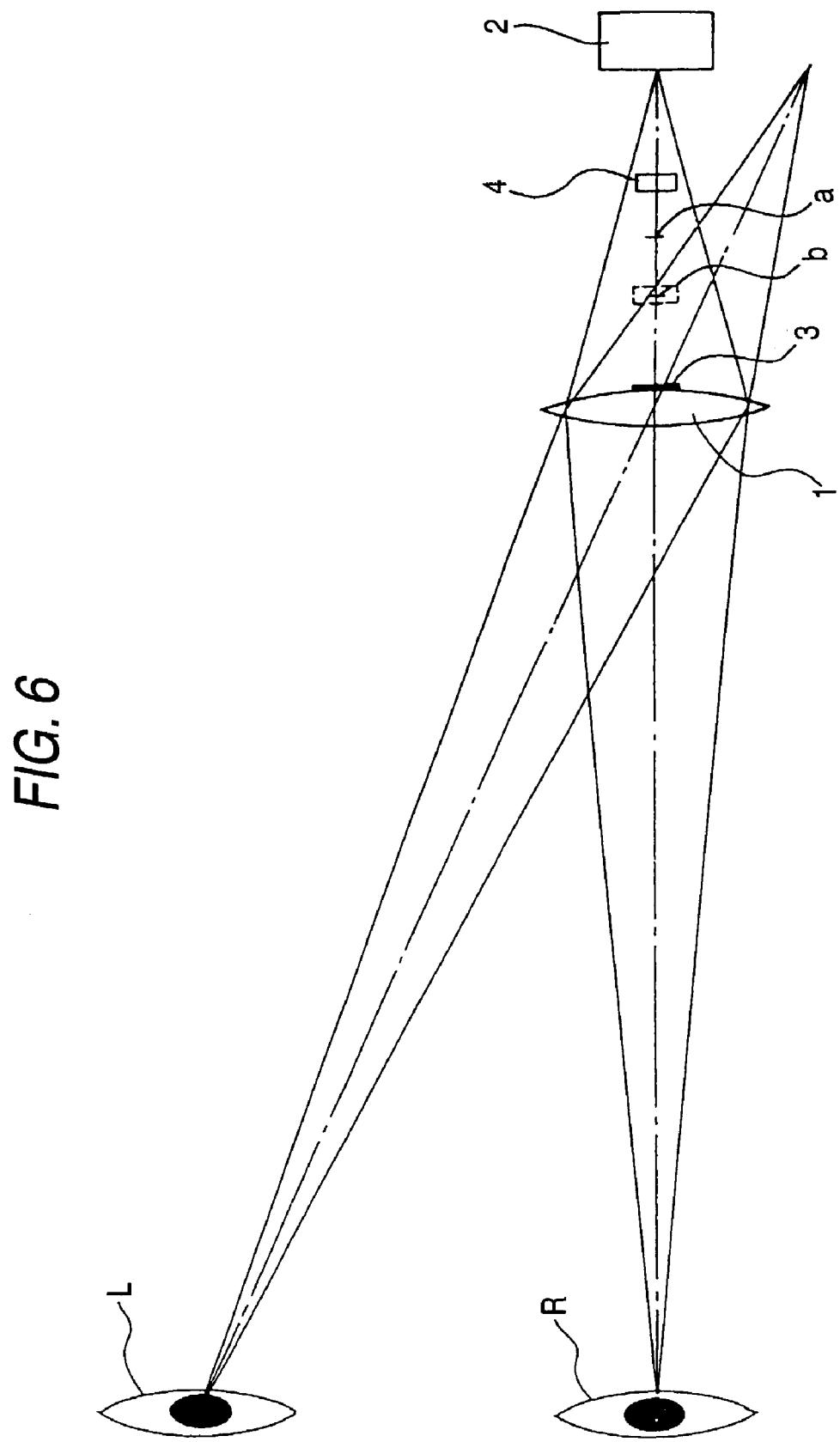
FIG. 6 explains the position of a light guide section in the proposed eye image pickup apparatus.
Figure 7:
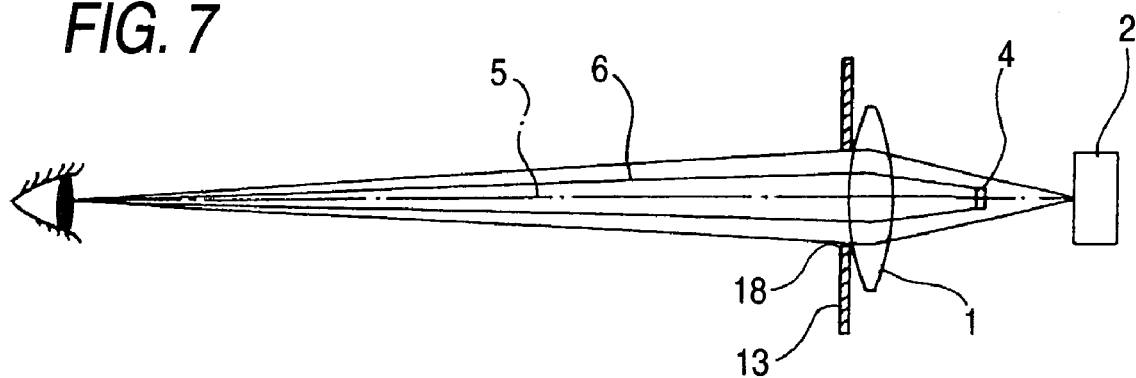
FIG. 7 shows a basic configuration of the proposed eye image pickup apparatus with an annular shading unit.
Figure 8A:
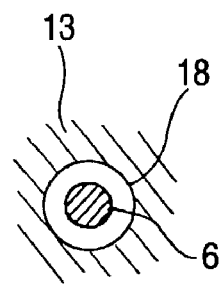
FIGS. 8A to 8D show examples of how the shading unit and the guiding visible light in the apparatus in FIG. 7 look like and the resulting images shot by the image pickup element.
Figure 8B:
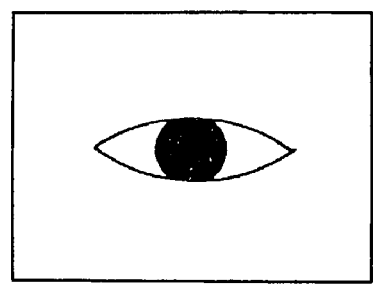
Figure 8C:
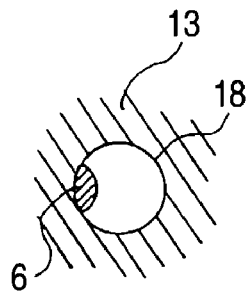
Figure 8D:
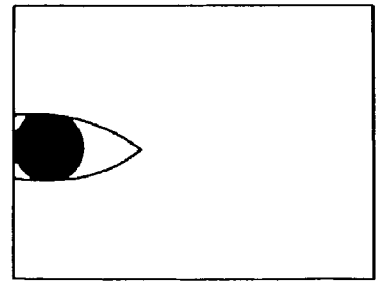
Figure 9:
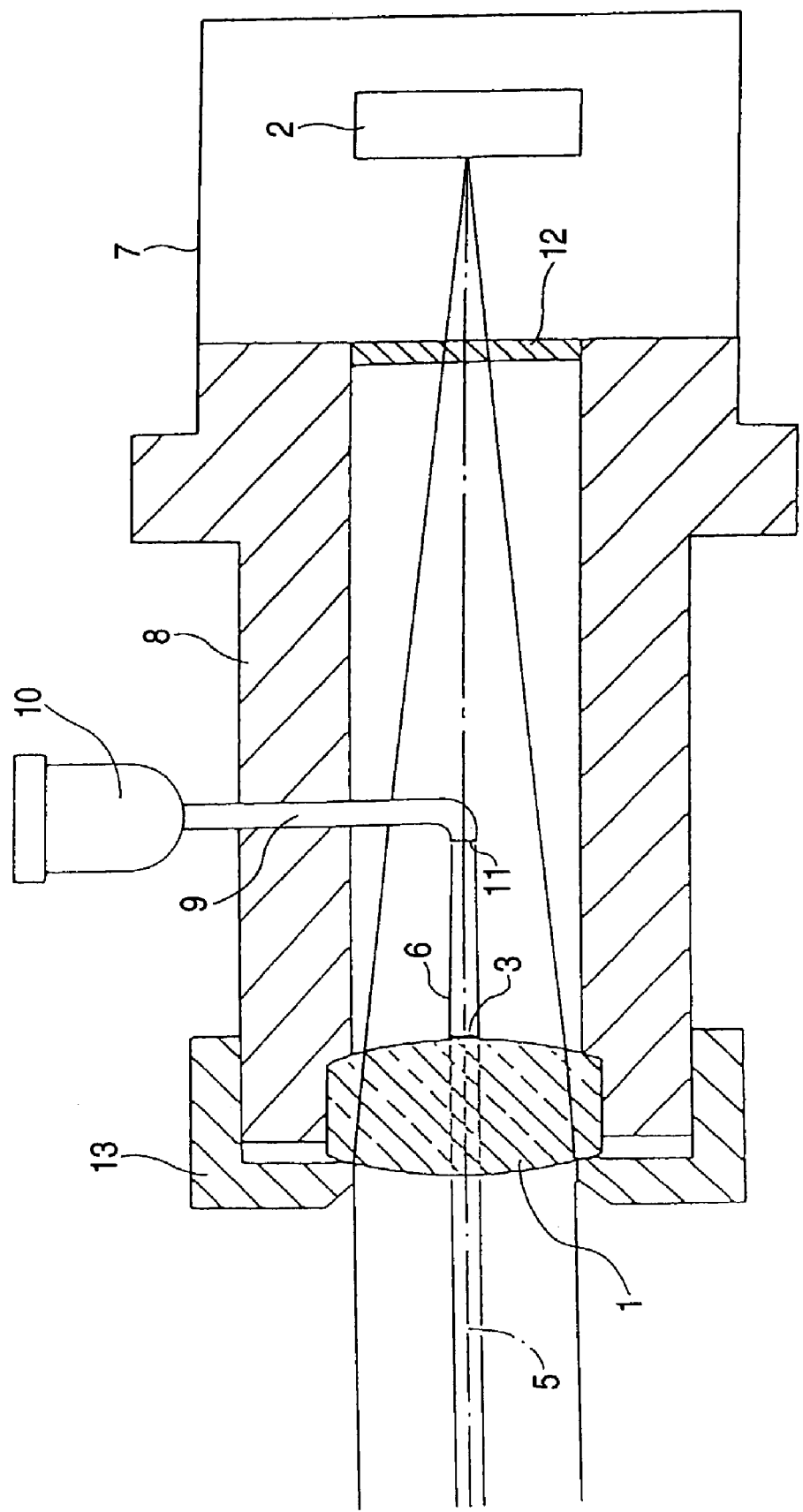
FIG. 9 shows a general configuration of a specific example of the proposed eye image pickup apparatus.
Figure 10:
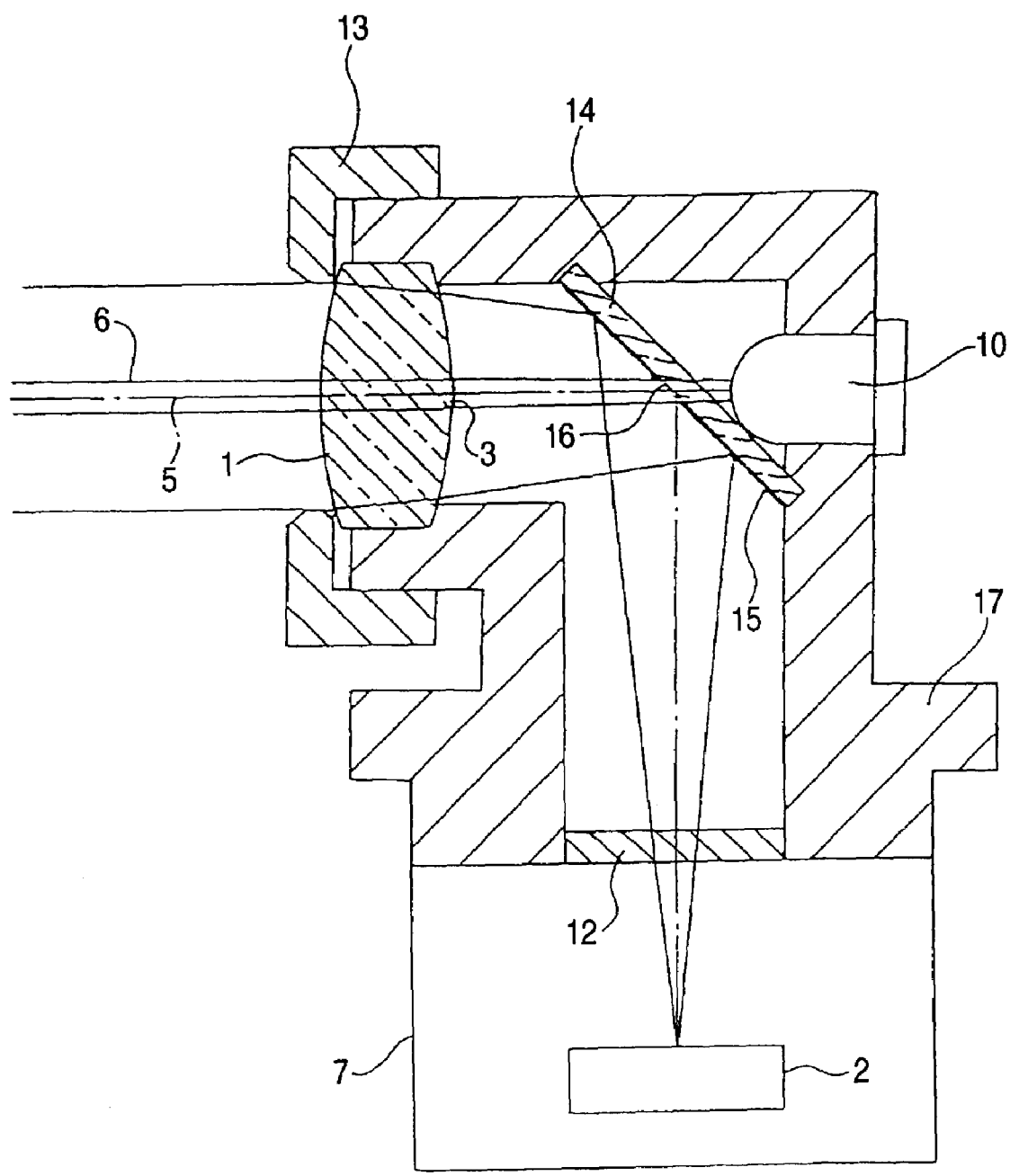
FIG. 10 shows a general configuration of another specific example of the proposed eye image pickup apparatus.

In case an eye image is shot by eye image pickup apparatus in FIG. 1, the user stands in front of the guide mirror 200 and moves his/her eye to the close proximity of the optical axis of the shooting optical path. The center of the visible light transmitting section 201 of the guide mirror 200 coincides with the optical axis 5 and the visible light transmitting section 201 looks darker than the peripheral sections so that it is easy to recognize the moving direction. When the eye moves to the close proximity of the optical axis, the user can recognize the guiding visible light 6 as shown in FIG. 5A. The user further moves his/her eye so that he/she can see the position guiding visible light 6 in the center of the visible light transmitting section 201 of the guide mirror 200 and makes alignment in the face orthogonal to the optical axis.

At the same time, the eye image pickup apparatus in FIG. 1 uses the range sensor 300 to measure the distance between the objective lens 1 and the subject to determine where the eye image is in focus. In case it is not in focus, the eye image pickup apparatus causes the guide message indicators 501 or 502 to instruct the moving direction. The user makes alignment in the direction of the optical axis 5 in accordance with the instruction. The instruction on whether the focus is achieved may be made using the color of the guiding visible light 6. The user, once accustomed to the necessary procedure, can recognize the moving direction from the color.

In case eye image pickup apparatus is used for an entry/leave management system, the eye image pickup apparatus is arranged in close proximity of the entrance/exit of the room under entry/leave management and an iris of a person entering/leaving the room is shot for entry/leave management. A mechanism to identify a person entering/leaving the room for management is known so that the corresponding explanation will be omitted.

As understood from the foregoing description, rough guidance is made using a guide mirror according to the invention. Further, it is possible to correctly grasp the eye moving direction by way of the alignment of the mark with the guiding visible light seen when the user looks through the objective lens. Thus an unaccustomed user can position his/her eye to be shot on the shooting optical path correctly in a short time.

What is claimed is:

1. An eye image pickup apparatus comprising:
   an objective lens;
   an image pickup section;
   a mark section provided concentrically with an optical axis of a shooting optical system;
   a light guide section guiding a visible light from a visible light source toward said objective lens at a midpoint in a shooting optical path, said light guide section provided closer to said image pickup section than said mark section, and center of said light guide section coincides with said optical axis;
   a guide mirror for providing rough guidance to a person wishing to shoot an eye image, said guide mirror having a visible light transmitting section arranged concentrically with said optical axis, said visible light transmitting section being arranged in front of said objective lens; and
   an apparatus body that contains the objective lens, the image pickup section, the mark section and the light guide section therein, wherein the guide mirror is provided on a front face of the apparatus body,
   wherein said light guide section and said mark section are seen by the person.

2. The Eye image pickup apparatus as claimed in claim 1, further comprising a light projecting/receiving range sensor provided below said objective lens, wherein an output of said light projecting/receiving range sensor is used for guiding the person to the shooting position in the direction of the optical axis.

3. The eye image pickup apparatus as claimed in claim 2, wherein said light projecting/receiving range sensor comprises a light projector and a light receiver, and wherein said light projector and said light receiver are arranged in the perpendicular direction.

4. The eye image pickup apparatus as claimed in claim 2, wherein the output of said light projecting/receiving range sensor is visualized for guiding the person to the shooting position in the direction of the optical axis.

5. The eye image pickup apparatus as claimed in claim 1, wherein said light guide section is arranged at a position closer to said image pickup section than the middle point of said objective lens and said image pickup section.

6. The eye image pickup apparatus as claimed in claim 1, wherein said mark section comprises a shading unit for shading part of the shooting optical path.

7. The eye image pickup apparatus as claimed in claim 6, wherein said shading unit is provided in an annular way on the periphery of said objective lens.

8. The eye image pickup apparatus as claimed in claim 7, wherein said shading unit is formed by a lens catch of said objective lens.

9. The eye image pickup apparatus as claimed in claim 7, wherein said shading unit is formed by said visible light transmitting section of said guide mirror.

10. The eye image pickup apparatus as claimed in claim 1, wherein said shooting optical system includes an optical path bending mirror between said objective lens and said image pickup section, wherein said light guide section includes a visible light transmitting section formed around said optical axis of said optical path bending mirror.

11. The eye image pickup apparatus as claimed in claim 10, further comprising a dual-color LED arranged behind said visible light transmitting section to provide the visible light guided by said light guide section, wherein said dual-color LED is controlled to change its color between when focus is achieved and when it is not.

12. The eye image pickup apparatus as claimed in claim 11, wherein said visible light further changes its color depending on the direction of dislocation assumed in case focus is not achieved.

13. The eye image pickup apparatus as claimed in claim 11, further comprising:
   an illuminating unit to illuminate a subject via an infrared light; and
   a visible light cutoff filter provided between the guide position of said visible light and said image pickup section and shading a visible light introduced into said image pickup section.

14. An entry/leave management system using eye image pickup apparatus as claimed in claims 1.

15. The eye image pickup apparatus as claimed in claims 1, wherein the object lens is arranged between the guide mirror and the image pickup section.

* * * * *